United States Patent [19]
Dor

[11] Patent Number: 5,272,514
[45] Date of Patent: Dec. 21, 1993

[54] MODULAR DAY/NIGHT WEAPON AIMING SYSTEM

[75] Inventor: Amotz Dor, Scottsdale, Ariz.

[73] Assignee: Litton Systems, Inc., Beverly Hills, Calif.

[21] Appl. No.: 804,111

[22] Filed: Dec. 6, 1991

[51] Int. Cl.$^5$ .............................................. G02B 23/10
[52] U.S. Cl. .................................... 356/251; 33/241; 42/100; 42/103
[58] Field of Search .................. 356/251, 252; 42/100, 42/101, 103; 33/241-243; 250/213 VT

[56] References Cited

U.S. PATENT DOCUMENTS

| | | | |
|---|---|---|---|
| 4,266,873 | 5/1981 | Hacskaylo et al. | 356/251 |
| 4,417,814 | 11/1983 | Doliber | 356/252 |
| 4,463,252 | 7/1984 | Brennan et al. | 250/213 VT |
| 4,658,139 | 4/1987 | Brennan et al. | 33/241 |
| 4,792,673 | 12/1988 | Blackler | 250/213 VT |
| 4,863,269 | 9/1989 | Ellis | 356/251 |

OTHER PUBLICATIONS

Eyes in the Dark-Night Vision in a New Light, by Greg Walker, dated Jul. 1989, pp. 54-61.
Night-Vision Goggles, by Mark Hewish, in Defense Electronics & Computing, dated Feb. 1992, pp. 17-24.
We Own the Night, by Doug Richardson, Armada International dated Oct./Nov. 1991, pp. 44-50.

Primary Examiner—F. L. Evans
Attorney, Agent, or Firm—Poms, Smith, Lan & Rose

[57] ABSTRACT

The improved day/night weapon sight comprises a red dot aiming portion having a light emitting diode, a combining mirror, and an apparatus for mounting the LED and the mirror on a weapon to produce a virtual image of the LED at an infinite distance in alignment with the bore sight of the weapon, and a removable night vision portion having an objective lens, an eyepiece, and an image intensification tube for intensifying a received image intermediate the objective lens and the eyepiece, wherein the virtual image is visible to the operator at night through the eyepiece, and the night vision portion is removed for use of the red dot aiming portion during the day.

42 Claims, 4 Drawing Sheets

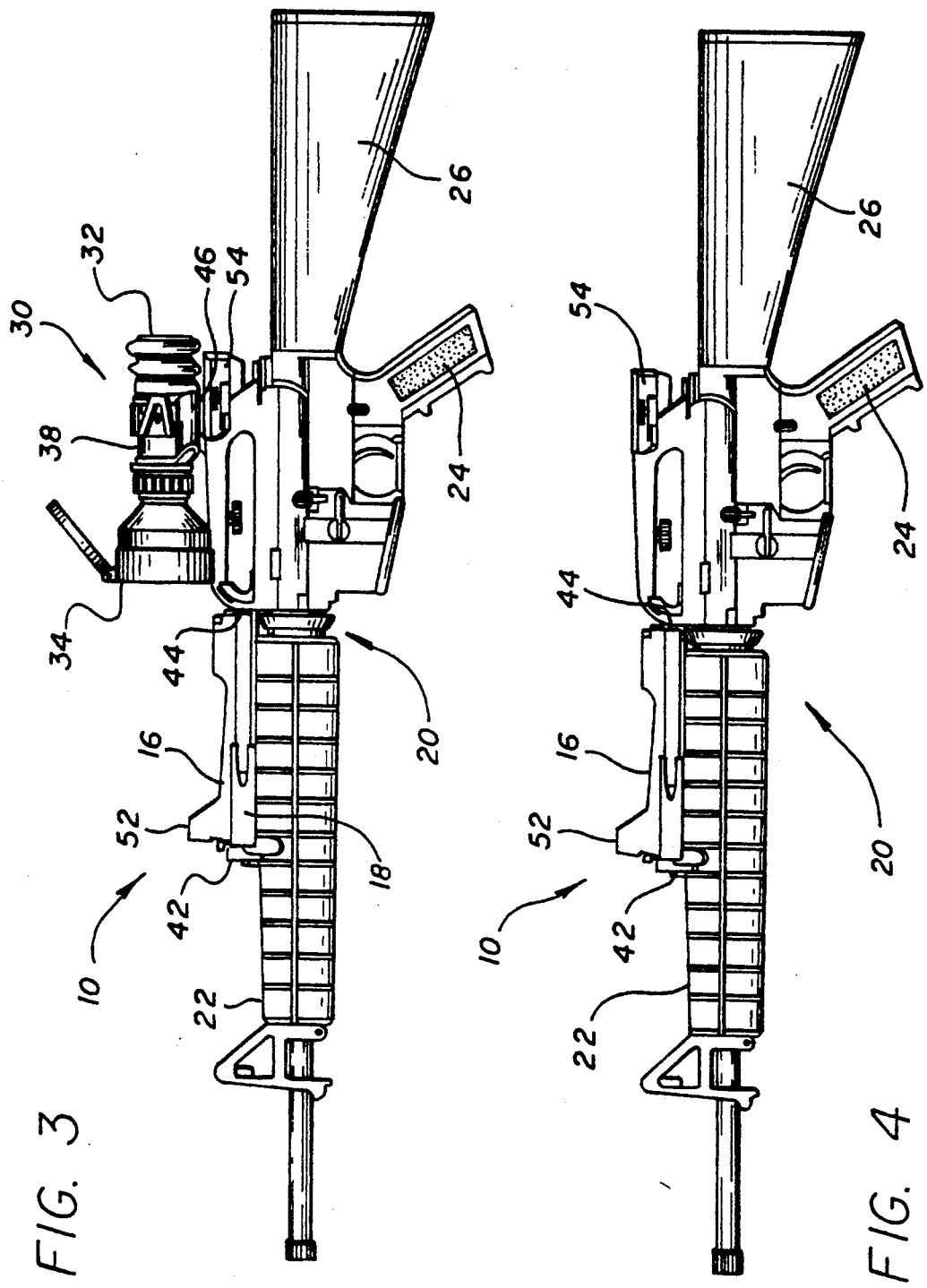

MODULAR DAY/NIGHT WEAPON AIMING SYSTEM

BACKGROUND OF THE INVENTION

1. Field of the Invention

The present invention relates to weapon sights, and more particularly to an improved modular weapon aiming system having both day and night aiming capability.

2. Description of Related Art

Military and law enforcement personnel who use weapons, such as handguns and rifles, have long sought ways to improve their aim. By improving their shooting accuracy, an operator increases his own effectiveness and chance of survival, while minimizing the possibility of innocent bystanders being shot.

Virtually every handgun and rifle comes equipped with a mechanical bore sight. The typical bore sight comprises a first upstanding member at the far end of the barrel and a second upstanding member at the close end of the barrel. The two members are of equivalent height. To use the bore sight, the operator visually sights down the length of the barrel of the gun, aligning the tops of the two members with the desired target. Usually, one or both of the members are laterally and vertically adjustable, so that the sight can be accurately calibrated for the particular operator.

It is also typical for operators of weapons to use the mechanical bore sight in conjunction with an optical scope. The scope would be mounted onto the upper surface of the weapon between the bore sight and the operator, and is usually equipped with magnification, such as three times magnification (3×). The operator can see the bore sight through the scope, as well as the distant target. This combination of bore sight and scope enables the operator to accurately aim at and strike these distant targets. However, it should be apparent that this sighting method is only operable in daylight conditions.

Modern technology has enabled great advances in weapon sighting. Most notably, the use of lasers has resulted in great improvements in sighting accuracy. A laser sight for a weapon comprises a low intensity laser which is mounted on top of the weapon. When the laser is activated, it points in the direction parallel to the barrel of the weapon. The spot of light formed by the laser provides a reticle for the operator to aim with. The operator simply shines the laser spot on the desired target. By seeing the laser spot on the desired target, the operator has instant feedback information assuring that the weapon is accurately aimed. The use of laser sighting systems can enable even relatively inexperienced operators to accurately hit their desired targets.

A significant drawback with laser sighting systems is that the laser light is also visible to observers, which can trace the source of the laser light back to the operator. This would effectively give away the location of the operator, putting him at risk to retaliation by hostile forces. This problem is compounded at night, when hostile forces are utilizing night vision systems which can see the infra-red light beam generated by the laser sight.

To solve this problem, passive sighting systems were developed. An improved passive sighting system utilizes a red-light source, such as a light emitting diode (LED), mounted at a point at the near end of the weapon barrel, and a combining mirror placed further down the length of the barrel and facing the LED. The mirror has a coating which reflects red light yet allows all other frequencies of light to pass through. The red light formed by the LED is reflected in the mirror, and is collimated in a direction parallel to the gun barrel and toward the operator, forming a virtual image of the red LED at an infinite distance aligned with the barrel. The virtual image provides a reticle for the operator which cannot be seen by others. The operator looks through the mirror, seeing the distant target and the virtual image of the red LED suspended at the sight point of the weapon. To aim the weapon, the operator centers the virtual image on the desired target. As with earlier systems, the position of the mirror can be adjusted to calibrate for alignment with the barrel, and for the specific operator. This passive red dot aiming system enables the operator to accurately strike his target, without illuminating the target or broadcasting his position.

A problem with this type of passive system, is that it is only effective during daylight conditions. At night, the operator would be unable to see the distant target, although the red light would continue to be visible. To remedy this problem, night vision systems are utilized. A night vision system intensifies the ambient light to produce an image. These systems require some residual light, such as moon or starlight, in which to operate. The ambient light is intensified by the night vision system to produce an output image which is visible to the human eye. The present generation of night vision systems utilize image intensification technologies to intensify the low level of visible ambient light and also make visible the light from the infra-red (IR) spectrum. The image intensification process involves conversion of the received ambient light into electron patterns and projection of the electron patterns on a phosphor screen for conversion of the electron patterns into light visible to the observer. This visible light is then viewed by the operator through a lens provided in the eyepiece of the system.

Night vision systems can be either mounted to the weapon itself, or can be worn by the operator as a goggle in either a face mask mounted or helmet mounted configuration. When mounted to the weapon, the night vision systems typically use 3× magnification as in the day light optical scopes. In contrast, night vision systems used as a goggle do not use 3× magnification, but instead remain at one times (1×) magnification, otherwise it would be difficult for the operator to function.

Night vision systems combined in a single optical scope with a passive red dot aiming system providing an internal reticle have been developed to provide an operator with accurate aiming capability at night or in conditions of darkness. However, the operator is unable to use the same system during the day. Operation of a night vision system during daylight would quickly cause damage to the internal image intensification tube. Thus the operator would have to remove the combined night vision red dot aiming system from the weapon and replace it with a red dot aiming system for use during daylight hours. Each time the aiming device is changed it would have to be recalibrated or re-aligned for the weapon and for the operator. In addition, the operator would have to carry both a daytime red dot aiming system, and a combined night vision scope/red dot aiming system for use at night. Since most law enforcement and military forces operating at night already utilize either face mask mounted or helmet mounted night vision systems, as described above, the use of a combined night vision scope/red dot aiming system would be redundant.

Combination scopes having night vision capability and red dot aiming systems which are switchable between day and night use are available in the prior art. These combination devices utilize a plurality of internal hinged mirrors to allow the observed image and reticle dot to bypass the image intensification tube during daytime usage. The operator can reconfigure the mirrors to direct the ambient light into the image intensification tube when desired. While this combined scope enables the operator to use the red dot aiming system in both daylight and night conditions, it adds considerable weight, bulk and complexity to the weapon. This is especially apparent during daytime, when the additional weight of the night scope portion is not in use. A further problem with this combination is that the plurality of moving mirrors can easily fall out of alignment, rendering the device useless.

Thus, it would be desirable to provide a modular, day/night aiming system which combines the red dot aiming system with a night vision system. It would be further desirable to provide a modular, day/night aiming system which combines a red dot aiming system with a night vision system that can be switched between day usage and night usage without requiring recalibration of the red dot aiming system. It would be further desirable to provide a modular, day/night aiming system which combines a red dot aiming system with a night vision system in which the night vision system could be simply removed from the combination for usage during the day. It would be further desirable to provide a modular, day/night aiming system which combines a red dot aiming system with a helmet mounted or face mask mounted night vision system.

SUMMARY OF THE INVENTION

Accordingly, a principal object of the present invention is to provide a modular, day/night aiming system which combines a red dot aiming system with a night vision system.

Another object of the present invention is to provide a modular, day/night aiming system wherein the red dot aiming system does not need to be recalibrated when switched between day usage and night usage.

Yet another object of the present invention is to provide a day/night aiming system which combines a red dot aiming system with a night vision system in which the night vision system can be simply removed from the weapon for usage during the day.

Still another object of the present invention is to provide a modular, day/night aiming system which combines a red dot aiming system with a helmet mounted or face mask mounted night vision system.

To achieve the foregoing objects and in accordance with the purpose of the invention, the improved day/night aiming system of the present invention comprises a red dot aiming portion having a red LED, a combining mirror, and an apparatus for mounting the LED and the mirror on a weapon to produce a virtual image of the LED at an infinite distant in alignment with the bore sight of the weapon, and a removable night vision portion having an objective lens, an eyepiece, an image intensification tube for intensifying a received image intermediate the objective lens and the eyepiece, and an apparatus for mounting the night vision portion in direct linear alignment behind the red dot aiming portion on the weapon.

In accordance with the invention viewed from another aspect, a weapon is provided with a basic aiming arrangement which produces a virtual image of a light source at an infinite distance in substantial alignment with the barrel of the weapon, and a removable night vision device having an image intensification capability with a field of view including the basic aiming arrangement and the virtual image of the light source. This system has the significant advantage that no additional alignment of the aiming arrangement is required upon addition of the night vision device to the weapon or following removal of it from the weapon.

An alternative embodiment of the present invention of a weapon aiming system operable during day and night conditions for a weapon having a barrel, the system comprises an aiming device for producing a virtual image of a light source at an infinite distance in substantial linear alignment with the barrel for providing a reticle for the operator of the weapon, and a device for mounting the aiming device to the weapon, and a detached night vision device for intensifying a received image. The detached night vision device could be either helmet mounted, or face mask mounted. With the basic aiming device in alignment with the weapon and a virtual image being provided, there is no need for the night vision device to be aligned with the weapon, whether or not the night vision unit is mounted on the weapon.

A more complete understanding of the modular, day/night weapon aiming system of the present invention will be afforded to those skilled in the art, as well as a realization of additional advantages and objectives thereof, by a consideration of the following detailed description of the preferred exemplary embodiment. Reference will be made to the appended sheets of drawings which will be first described briefly.

BRIEF DESCRIPTION OF THE DRAWINGS

FIG. 3 shows a side view of the day/night aiming system with a night vision system mounted for three power night usage;

FIG. 4 shows a side view of the day/night aiming system with the night vision portion removed for one power day usage;

DESCRIPTION OF THE PREFERRED EMBODIMENTS

Figure 1:
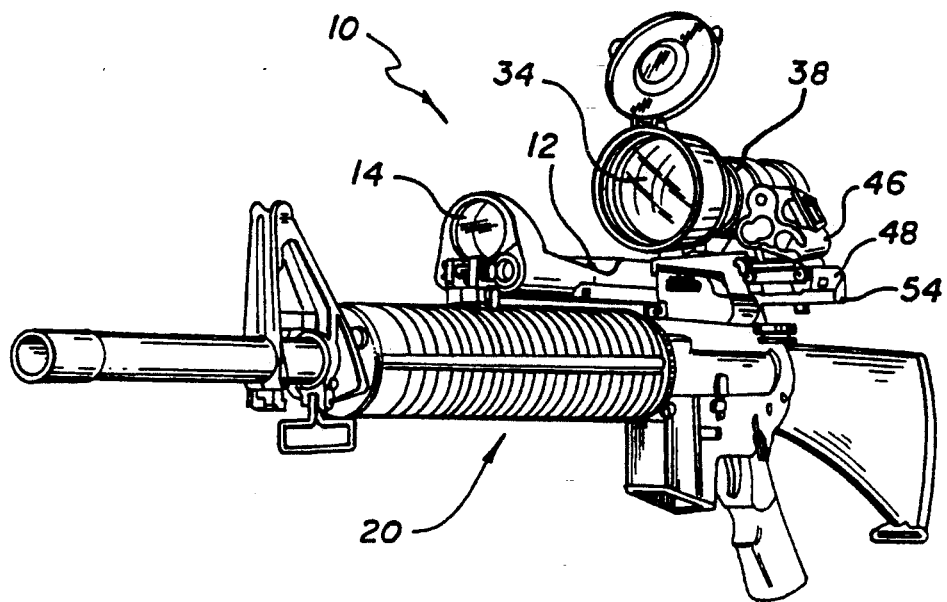
FIG. 1 shows a perspective view of the day/night aiming system comprising a red dot aiming portion and a night vision portion mounted to an assault type weapon.

Law enforcement and military forces have a critical need for accurate weapon aiming systems for use during either day or night conditions. The day/night aiming system of the present invention is shown in FIG. 1, as mounted to an assault weapon.

Figure 2:
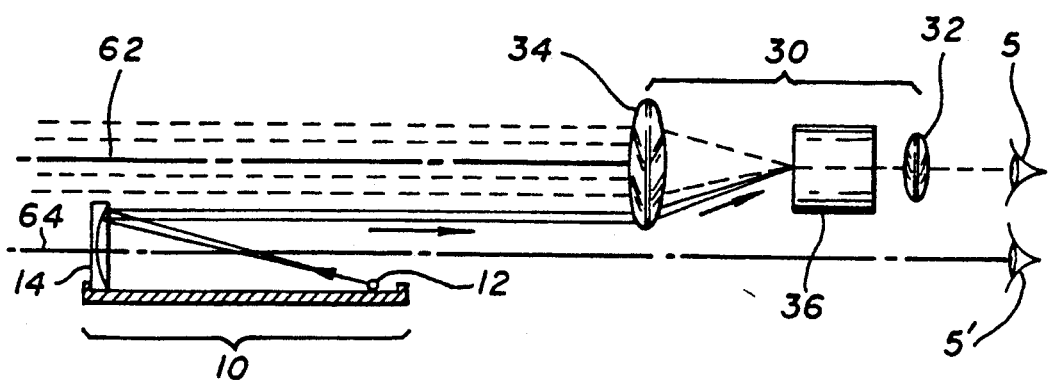
FIG. 2 shows a block diagram of the modular, day/night aiming system for a one or three power objective lens.

Referring next to the diagram of FIG. 2, there is shown a red dot aiming system 10 used in conjunction with a night vision system 30. The red dot aiming system 10 has a light source 12 and combining mirror 14. It is anticipated that the light source comprise a red light emitting diode (LED), because of the LED's high reliability, low weight, and low power consumption. The combining mirror 14 is provided of a transparent material and has a coating which reflects only red light frequencies; substantially all other frequencies of light are visible through mirror 14. The mirror 14 has a concave surface facing in the direction of operator 5, which collimates the reflected light so that it appears to come from an infinite distance.

The night vision system 30 has an eyepiece 32, an image intensification tube 42 and an objective lens 34. Ambient light, denoted by the broken arrows, passes through the objective lens 34 and is focused onto image intensification tube 36. As well known in the art, the image intensification tube 36 provides a visible image which can be seen by operator 5 through eyepiece 32.

An image intensification tube converts the light image projected through objective lens 34 to an electron pattern. The electrons are multiplied, and transmitted onto a phosphor screen. The phosphor screen produces a light image corresponding to the electron pattern, and is seen by the operator looking through eyepiece 32.

As shown in FIG. 2, the image of the red LED 12 is reflected in mirror 14, into a lower portion of objective lens 34. It should be apparent that light striking objective lens 34 which is parallel to the line of sight 62 of the lens, as denoted by the broken lines, will appear at the center of the image intensification tube 36. Since the night vision system 30 is aligned with the bore sight of the weapon, the reticle dot will appear in the center of the field of view of eyepiece 32, as a generally whitish dot in the generally greenish scene generated by the night vision system.

Now referring to FIG. 3, there is shown a red dot aiming system 10 in conjunction with monocular night vision scope 30, both mounted onto weapon 20. The red dot aiming system 10 shown is the Elbit FALCON Red-Dot Aimer, which is commercially available. The weapon 20 shown is an M-16 assault rifle, which is currently in use by the United States and various other military and police forces around the world. The weapon 20 has a barrel 22, a grip 24, and a stock 26. It should be apparent that the above principles can be readily applied to any other type of red dot aiming system and any other type of weapon.

Red dot aiming system 10 has a housing 16 which provides a mounting surface 18 for attachment to the exemplary weapon 20. The housing 16 has a forward attachment 42 and a rear attachment 44, which both attach to weapon barrel 22. Manipulation of adjustments 42 and 44 changes the linear alignment of red dot aiming system 10 with barrel 22, and is performed by the operator to calibrate the system. The raised portion 52 of housing 16 provides a mounting ring to hold mirror 14. LED 12 is provided in a rear portion of housing 16, at a point closer in position to the operator. The LED 12 and mirror 14 are shrouded so that reflected light from the LED is not directly visible from the side or front of housing 16 to other observers.

The red dot aiming system 10 is calibrated by the operator so that the virtual image of LED 12 appears at an infinite distance in linear alignment with the barrel 22 of the weapon 20. Anywhere the operator places his eye within a range of ±20 degrees relative to the stock 26 of weapon 20, the virtual image of the red dot observed in mirror 14 will always be aligned with barrel 22. Thus, the operator using the red dot aiming system 10 can accurately aim the weapon to strike a desired target by centering the reticle dot on the target and firing the weapon.

Night vision system 30 is also shown in FIG. 3, mounted on weapon 20 in a position behind that of the red dot aiming system 10. The exemplary night vision system 30 is of the monocular type, and has an optical portion comprising an eyepiece 32, an objective lens 34, a sleeve 38, and a housing 46 attached to the optical portion. The image intensification tube 42, substantially described above, is contained within sleeve 38. As known in the art, ambient light enters objective lens 34, is processed by image intensification tube 42, and is observed by looking into eye piece 32.

Mounting plate 48 is provided on housing 46 to attach the night vision system 30 to weapon 20. The mounting plate 48 has a dovetail shape, and is configured to be engaged by carriage 54 which is secured to the weapon 20. The carriage 54 mechanically secures the mounting plate 48, but is intended to allow the operator to easily remove the night vision system 30 from the weapon 20 by disengaging the carriage 52.

There are four anticipated modes of operation for the day/night aiming system of the present invention. During night usage, the operator can use the red dot aiming system 10 in conjunction with either a mounted or unmounted night vision system 30. FIG. 3 shows the first mode of operation as having the red dot aiming system 10 and night vision system 30 mounted to weapon 20, as substantially described above. In this embodiment, the objective lens 34 would have 3× magnification, and would be of a diameter greater than that of mirror 14. Accordingly, the field of the night vision system 30 would be larger than, and would encompass that of, mirror 14 of red dot aiming system 10. The virtual image of the red LED 12 would appear as a white dot centered on the phosphor screen of image intensifier tube 36.

The block diagram of FIG. 2 shows the line of sight 62 of observer 5 passing through night vision system 30 and above mirror 14. Since objective lens 34 has 3× magnification, the observer looking through eyepiece 32 would be viewing light which has partially passed through mirror 14. Thus, in this mode of operation, the operator can focus on a distant target, while looking partially through mirror 14. It should be apparent from the above discussion, that alignment of the night vision system 30 to the weapon 20 is unnecessary, since only the red dot aiming system 10 need be calibrated, and that removal or installation of the night vision system 30 does not alter the calibration of the red dot aiming system 10.

Figure 5:
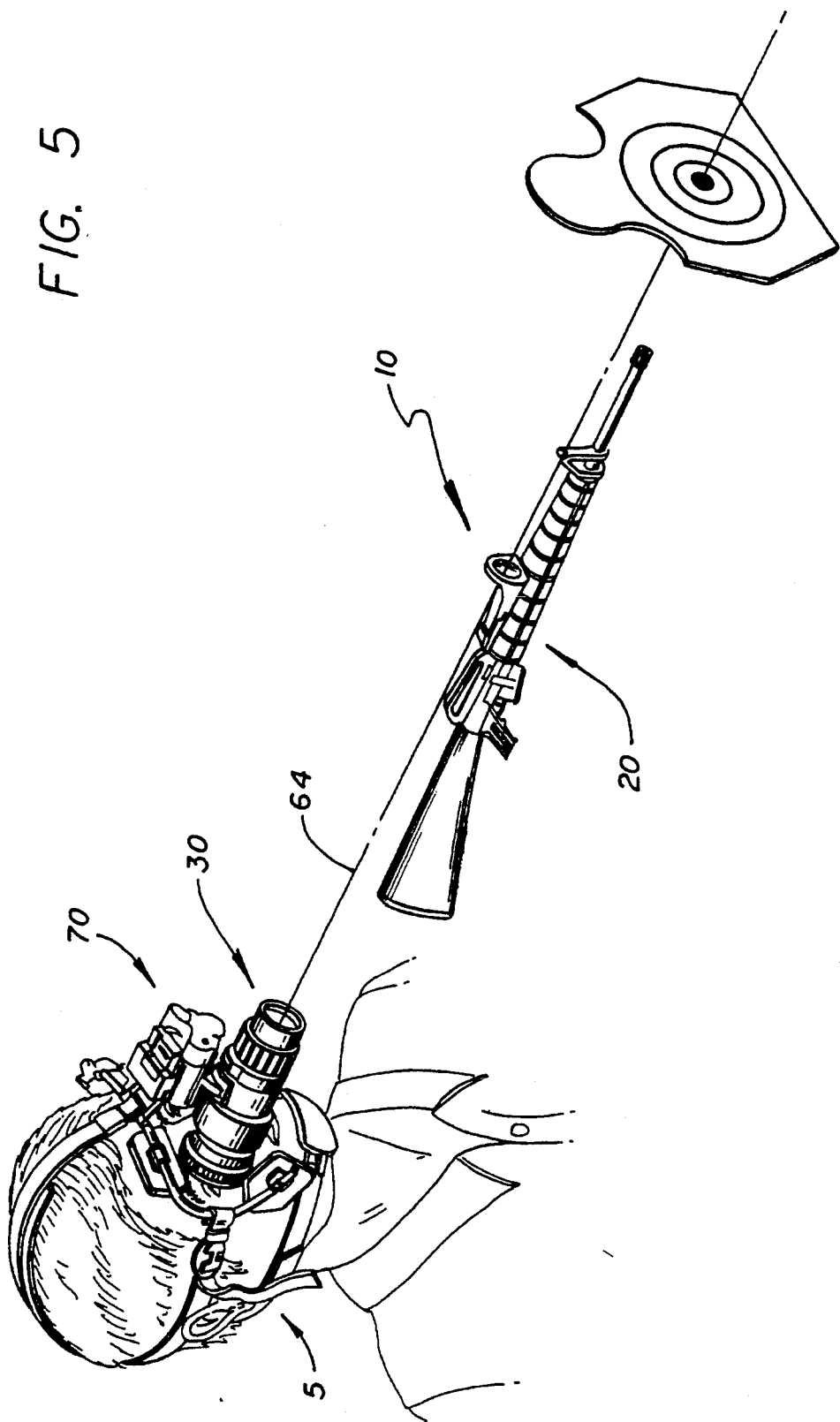
FIG. 5 shows a perspective view of the day/night aiming system with a face mask mounted night vision system for one power night usage.
Figure 6:
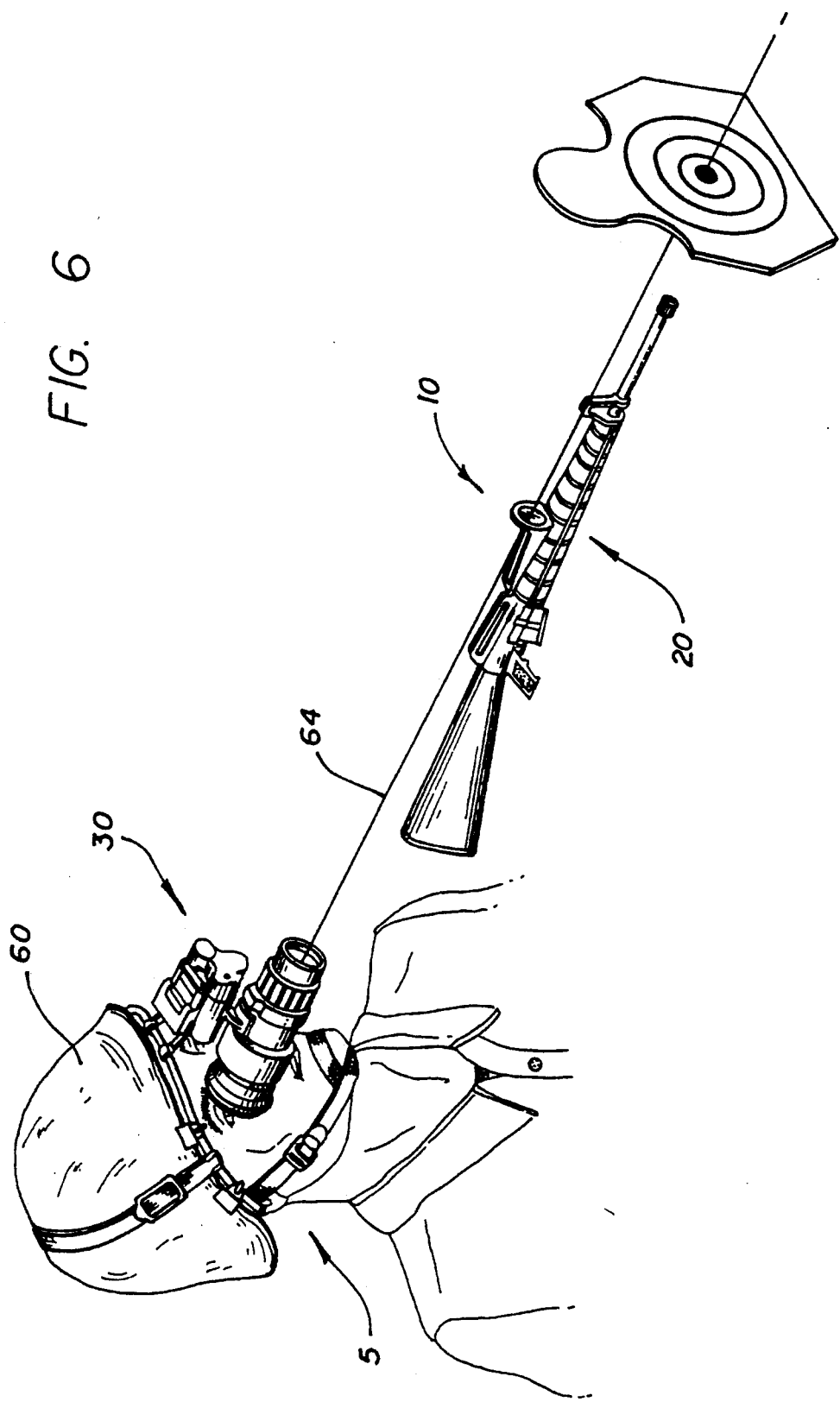
FIG. 6 shows a perspective view of the day/night aiming system with a helmet mounted night vision system.

In the second mode of operation, the red dot aiming system 10 mounted on weapon 20 would be further used in conjunction with a night vision system 30 which is detached from weapon 20. The night vision system 30 can be either a helmet mounted system, as shown in FIG. 6, or a face mask mounted system, as shown in FIG. 5. These systems typically use 1× magnification only, since it would be too difficult for an operator to function normally with high powered lenses.

Using either of these night vision systems, the operator can continue to use the red dot aiming system 10, so long as the night vision system is positioned within the field of view of mirror 14. As described above, a white reticle dot image is formed on the image intensification tube 42, corresponding with the bore sight of weapon 20. However, the reticle dot image will only appear centered in the field of view of the night vision system if held in alignment with the barrel 22. Further, the line of sight of the detached night vision system 30 must coincide with the line of sight 64 of the mirror 14, as shown in FIG. 2.

The third and fourth modes of operation are during daylight conditions, in which the night vision system 30 is no longer required and can be simply removed from its mount on weapon 20. This third mode of operation is shown in FIG. 4. The red dot aiming system 10 would continue to be operational, and would not require any additional calibration. Since the estimated weight of the night vision system 30 is 620 grams, it should also be apparent that the removal of the night vision system 30 would significantly reduce the effective weight of weapon 20.

Finally, in the fourth mode of operation, the operator can install a daylight vision scope having 3× magnification. The daylight scope would mount into carriage 54, in place of the night vision system 30. As with the first mode of operation, the operator would see the reticle dot in the center of the eyepiece of the daylight scope.

Having thus described a preferred exemplary embodiment of an improved day/night weapon sight, it should now be appear to those skilled in the art that the aforestated objects and advantages for the within system have been achieved. Thus, by way of example and not limitation, the light source need not be a red dot but could have other color components although it is preferably matched to the mirror's reflection properties so that the light is reflected back to the operator. It should also be appreciated by those skilled in the art that various modifications, adaptations, and alternative embodiments thereof may be made within the scope and spirit of the present invention which is defined by the following claims.

What is claimed is:

1. A modular weapon aiming system operable during day and night conditions for a weapon having a barrel, the system comprising:
    an aiming portion having a light source, a combining mirror, and means for mounting said aiming portion to said weapon to produce a virtual image of said light source at an infinite distance in substantial linear alignment with said barrel, said virtual image providing a reticle; and
    a removable night vision portion for intensifying a received image and means for removably mounting said night vision portion to said weapon in substantial linear alignment behind said aiming portion to provide said reticle visible through said night vision portion.

2. The aiming system of claim 1, wherein said light source is a red light emitting diode (LED).

3. The aiming system of claim 2, wherein said mirror is formed of a substantially transparent material which reflects only red light frequencies and a has a generally concave surface facing in the rearward direction relative said weapon.

4. The aiming system of claim 3, wherein said aiming portion further comprises a housing having a mounting ring holding said mirror and a shroud surrounding the edges of said mirror to shield said mirror from undesired lateral observation.

5. The aiming system of claim 4, wherein said night vision portion comprises an objective lens, an eyepiece, and an image intensification means for intensifying a received image intermediate said objective lens and said eyepiece.

6. The aiming system of claim 5, wherein the diameter of said mirror is smaller than the diameter of said objective lens.

7. The aiming system of claim 6, wherein said aiming portion produces an image of said light source visible through said eyepiece in substantial linear alignment with said barrel when said night vision portion is mounted by use of said mounting means.

8. The aiming system of claim 7, wherein said night vision portion is a monocular.

9. The aiming system of claim 7, wherein said night vision portion is removed from said weapon during day usage.

10. The aiming system of claim 7, wherein said objective lens provides three times magnification.

11. A weapon aiming system operable during day and night conditions for a weapon having barrel, the system comprising:
    an aiming means for producing in a viewing field a virtual image of a light source at an infinite distance in substantial linear alignment with said barrel for providing a reticle for the operator of said weapon, said aiming means comprising a single combining mirror having a generally concave surface facing said light source to define said viewing field in a rearward direction relative said weapon;
    a removable night vision means for intensifying a received image and having a field of view which includes said viewing field provided by said combining mirror; and
    whereby alignment of said night vision means to said weapon is unnecessary.

12. The aiming system of claim 11, wherein said night vision means further comprises an eyepiece, an objective lens, an image intensification tube, and a housing.

13. A weapon aiming system operable during day and night conditions for a weapon having a barrel, said system comprising:
    an aiming means for producing in a viewing field a virtual image of a light source at an infinite distance in substantial linear alignment with said barrel capable of providing a reticle for the operator of said weapon, said aiming means comprising a single combining mirror having a generally concave surface facing said light source to define said viewing field in a rearward direction relative said weapon, and means for mounting said aiming means to said weapon; and
    a night vision means having a field of view for intensifying a received image and at least partially including said viewing field for providing said reticle within the field of view of said night vision means.

14. The aiming system of claim 13, wherein said night vision means is detached from both said weapon and said aiming means.

15. The aiming system of claim 14, wherein said night vision means further comprises an eyepiece, an objective lens, an image intensification means for intensifying a received image intermediate said eyepiece and said objective lens, and a housing affixed to said night vision means.

16. The aiming system of claim 15, wherein said light source is a red light emitting diode (LED).

17. The aiming system of claim 16 wherein said combining mirror is formed of a substantially transparent material which reflects only red light frequencies.

18. The aiming system of claim 17, wherein said aiming means produces an image of said light source visible through said eyepiece in substantial linear alignment with said barrel when said detached night vision means is positioned within the field of view of said aiming means.

19. The aiming system of claim 18, wherein said detached night vision means is mounted to a face mask worn by said operator.

20. The aiming system of claim 18, wherein said detached night vision means is mounted to a helmet worn by said operator.

21. A weapon aiming system operable during day and night conditions for a weapon having a barrel, the system comprising:

an aiming means for producing a virtual image of a light source at an infinite distance in substantial linear alignment with said barrel for providing a reticle for the operator of said weapon;

a removable night vision means for intensifying a received image and having a field of view which includes the field of view of said aiming means, said night vision means further comprising an eyepiece, an objective lens, an image intensification tube, and a housing; and means for mounting said aiming means and said night vision means on said weapon in substantial linear alignment with said barrel and with said night vision means behind said aiming means relative said weapon to provide said reticle visible to said operator through said eyepiece;

whereby alignment of said night vision means to said weapon is unnecessary.

22. The aiming means of claim 21, wherein said light source is a red light emitting diode (LED).

23. The aiming system of claim 22, wherein said aiming means further comprises a combining mirror formed of a substantially transparent material which reflects only red light frequencies, and has a generally concave surface facing said light source in the rearward direction relative said weapon.

24. The aiming system of claim 23, wherein the mounting means further comprises a mounting plate provided on said housing and a carriage affixed to said weapon and configured to receive said mounting plate in locking engagement.

25. The aiming system of claim 24, wherein said aiming means produces an image of said light source visible through said eyepiece in substantial linear alignment with said barrel when said night vision portion is mounted by use of said mounting means.

26. The aiming system of claim 25, wherein said night vision means is removed from said weapon during day usage.

27. The aiming system of claim 23, wherein the diameter of said mirror is smaller than the diameter of said objective lens.

28. The aiming of claim 23, wherein said objective lens provides three times magnification.

29. A weapon aiming system operable during day and night conditions for a weapon having a barrel, said system comprising:

an aiming means for producing a virtual image of a light source at an infinite distance in substantial linear alignment with said barrel capable of providing a reticle for the operator of said weapon, and means for mounting said aiming means to said weapon;

a night vision means for intensifying a received image and for providing said reticle within the field of view of said night vision means; and means for mounting said night vision means on said weapon in substantial linear alignment with said barrel and behind said aiming means relative said weapon.

30. A weapon aiming system operable during day and night conditions for a weapon having a barrel, said system comprising:

a aiming means for producing an image of a light source in substantial linear alignment with said barrel capable of providing a reticle for the operator of said weapon, said aiming means comprising a single reflecting element having a generally concave surface facing said light source in a rearward direction relative said weapon; and a night vision means for intensifying a received image and for providing said reticle within a field of view of said night vision means, said night vision means being mounted to the head of the operator and detached from said aiming means.

31. A weapon aiming system operable during day and night conditions for a weapon having a barrel, said system comprising:

a means for projecting an image of a reticle into an input of a night vision receiver, said projecting means comprising a single reflecting element having a generally concave surface facing in a rearward direction relative said weapon; and said night vision receiver being mounted to the head of the operator and detached from said projecting means.

32. A modular weapon aiming system operable during day and night conditions for a weapon, the system comprising:

an aiming means for projecting an image of a reticle for said weapon, and means for mounting said aiming means to said weapon; and a night vision means for intensifying a received image including an objective lens, and means for removably mounting said night vision means to said weapon to provide said reticle image visible through said night vision means.

33. The aiming system of claim 32, wherein said aiming means comprises a light source and a single combining mirror, said reticle image being illuminated by said light source;

wherein said combining mirror projects a virtual image of said reticle image onto said objective lens.

34. The aiming system of claim 33, wherein said mirror is formed of substantially transparent material which reflects only light frequencies of said light source.

35. The aiming system of 34, wherein said light source is of a predetermined color, and said mirror transmits light of other colors.

36. The aiming system of claim 35, wherein at least a portion of the light from said received image reaching said objective lens passes through said mirror.

37. An aiming system for a weapon operable during night and day, and capable of producing an intensified image of a scene under night conditions, comprising:

a night vision portion capable of producing said intensified image of said scene, said night vision portion having an objective lens;

an aiming means for projecting an image of a reticle for said weapon, said aiming means including a light source of a predetermined color, and a combining mirror formed of a transparent material having a concave surface which reflects light of said predetermined color and transmits light of other colors, said concave surface capable of defining and projecting in a viewing field rearwardly of said weapon a virtual image of said reticle image into said objective lens;

means for mounting said aiming means to said weapon; and wherein said aiming means and said night vision portion are so disposed that at least a portion of light from said scene is transmitted through said concave combining mirror in said viewing field and into said objective lens.

38. The aiming system of claim 37, wherein said night vision portion is a viewer worn by a user of said weapon.

39. The aiming system of claim 38, wherein said viewer is a monocular.

40. The aiming system of claim 38, wherein said viewer is mounted to the head of said user.

41. The aiming system of claim 38, wherein said viewer is mounted to a helmet worn by said user.

42. A weapon aiming system operable during day and night conditions for a weapon having a barrel, said system comprising:

a means for projecting an image of a reticle into an input of a night vision receiver, said projecting means comprising a single reflecting element having a generally concave surface facing in a rearward direction relative said weapon, and said night vision receiver being detached from said projecting means.

* * * * *